(12) United States Patent
Park et al.

(10) Patent No.: US 12,334,745 B1
(45) Date of Patent: Jun. 17, 2025

(54) PASSIVE WIRELESS POWER TRANSFERRING SYSTEM FOR RADIO FREQUENCY ENERGY RELAY

(71) Applicant: CAES Systems LLC, Arlington, VA (US)

(72) Inventors: Chul Hong Park, Blue Bell, PA (US); Yongjae Lee, Blue Bell, PA (US)

(73) Assignee: CAES Systems LLC, Arlington, VA (US)

( * ) Notice: Subject to any disclaimer, the term of this patent is extended or adjusted under 35 U.S.C. 154(b) by 127 days.

(21) Appl. No.: 18/185,804

(22) Filed: Mar. 17, 2023

(51) Int. Cl.
| | |
|---|---|
| *H02J 50/00* | (2016.01) |
| *B64U 10/00* | (2023.01) |
| *B64U 101/20* | (2023.01) |
| *H01Q 15/00* | (2006.01) |
| *H02J 50/27* | (2016.01) |
| *H02J 50/80* | (2016.01) |

(52) U.S. Cl.
CPC ............ *H02J 50/001* (2020.01); *B64U 10/00* (2023.01); *H01Q 15/0006* (2013.01); *H02J 50/27* (2016.02); *H02J 50/80* (2016.02); *B64U 2101/20* (2023.01)

(58) Field of Classification Search
CPC .......... H02J 50/001; H02J 50/80; H02J 50/27; B64U 10/00; B64U 2101/20; H01Q 15/0006
USPC .......................................................... 307/9.1
See application file for complete search history.

(56) References Cited

U.S. PATENT DOCUMENTS

| | | | | |
|---|---|---|---|---|
| 2018/0323657 A1* | 11/2018 | Hannigan | ............... | H02J 50/23 |
| 2023/0166867 A1* | 6/2023 | Dow | ....................... | B64F 1/362 |
| | | | | 320/108 |

* cited by examiner

*Primary Examiner* — Michael R. Fin
(74) *Attorney, Agent, or Firm* — Alston & Bird LLP

(57) ABSTRACT

Various embodiments of the present disclosure describe radio frequency (RF) enabled devices, system, and RF energy relaying techniques for selectively harvesting and/or relaying RF energy signals. An RF-enabled device may include an antenna unit configured to receive a radio frequency signal and a switch component electrically coupled to the antenna unit. The switch component may be associated with a plurality of signal processing states that include at least a collection state and a reflection state. The RF-enabled device may include a controller that is configured to selectively transition the switch component between the collection state and the reflection state based at least in part on one or more power transfer stimuli. At a collection state, an RF energy signal may be harvested. At a reflection state, the RF energy signal may be reflected to another entity within a proximity to the RF-enabled device.

11 Claims, 6 Drawing Sheets

PASSIVE WIRELESS POWER TRANSFERRING SYSTEM FOR RADIO FREQUENCY ENERGY RELAY

TECHNICAL FIELD

The disclosed embodiments relate generally to radio frequency (RF) technology, including but not limited to methods and systems for relaying RF energy between multiple RF-enabled devices.

BACKGROUND

Traditional RF energy harvesting techniques exist that allow RF-enabled devices to harvest energy from RF energy signals transmitted by an originating transmitting entity. Such techniques may be implemented in a number of different domains to reduce weight requirements for different devices by replacing large, heavy, power storage components with smaller, lightweight, power storage components that may be continuously replenished by RF energy signals. RF energy signals are either: (i) broadcasted to open space for reception by targets within a general area or (ii) steered using beamforming or direction finding techniques to a particular target. Therefore, the range at which a particular target may be charged is limited by a distance between the target and the originating transmitting entity. Targets outside this range (e.g., outside an originating transmitting entity's line of sight) may be unable to collect energy from the originating transmitting entity. Moreover, once received, RF energy signals are either harvested or discarded by the target. This leads to energy waste and inefficiencies which may be exacerbated by smaller, lightweight, power storage components that may be fully charged in shorter periods of time. Various embodiments of the present disclosure make important contributions to various existing RF energy harvesting techniques by addressing each of these technical challenges.

BRIEF SUMMARY

Various embodiments described herein relate to methods, apparatuses, and systems for supporting effective radio frequency relays with passive wireless transfer energy techniques.

In some embodiments, a computing system is provided. The computing system includes an antenna unit configure to receive a radio frequency signal; a switch component electrically coupled to the antenna unit, wherein the switch component is associated with a plurality of signal processing states that comprise at least a collection state and a reflection state; and a controller configured to selectively transition the switch component between the collection state and the reflection state based at least in part on one or more power transfer stimuli.

In some embodiments, a computer-implemented method is provided. The computer-implemented method includes receiving, via one or more input devices, input data for a state transition model; detecting, using the state transition model, at least one power transfer stimuli for an RF-enabled device, wherein the at least one power transfer stimuli is based at least in part on (i) an energy threshold for the RF-enabled device or (ii) a proximity threshold between the RF-enabled device and an external reflection target; and in response to the power transfer stimuli, transitioning a switch component of the RF-enabled device to a particular state based at least in part on the input data, wherein the switch component is associated with a plurality of signal processing states that comprise at least a collection state and a reflection state.

In some embodiments, an unmanned aerial vehicle includes an antenna unit configured to receive a radio frequency signal; a switch component electrically coupled to the antenna unit, wherein the switch component is associated with a plurality of signal processing states that comprise at least a collection state and a reflection state; and a controller configured to selectively transition the switch component between the collection state and the reflection state based at least in part on one or more power transfer stimuli.

Note that the various embodiments described above may be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the subject matter described herein.

BRIEF DESCRIPTION OF THE DRAWINGS

So that the present disclosure may be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features as the person of skill in this art will appreciate upon reading this disclosure.

Figure 1:
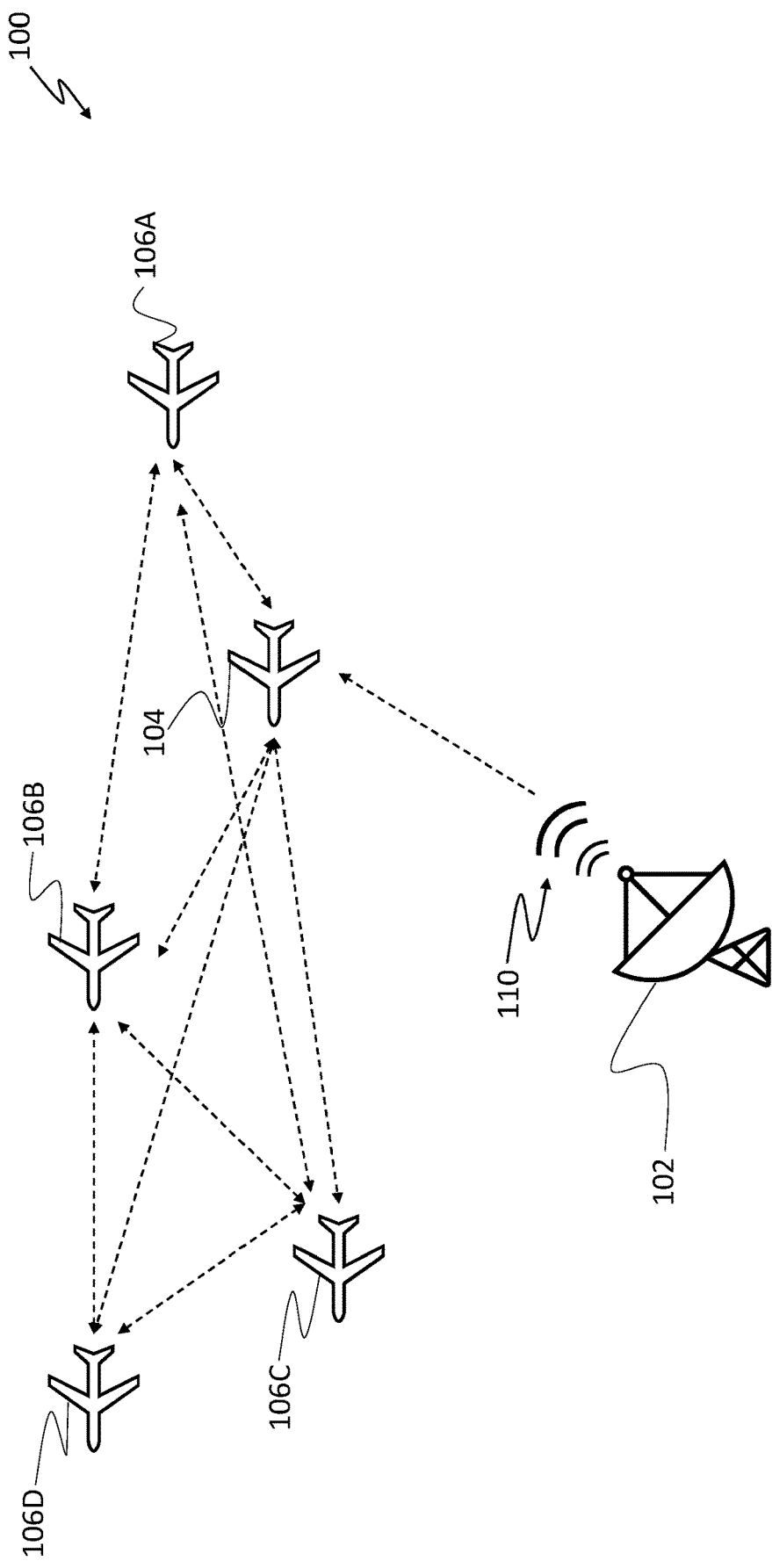
FIG. 1 illustrates an example energy relay ecosystem, in accordance with some embodiments of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

In some embodiments of the present disclosure, a plurality of RF-enabled devices may interact to relay RF-based energy between the devices using RF energy harvesting techniques. Using the techniques of the present disclosure, RF energy signals (e.g., the energy imparted thereof) may be relayed between multiple RF-enabled devices based at least in part on their respective locations and energy requirements. To do so, new RF signal processing techniques are disclosed to effectively relay RF energy using a passive wireless power transferring system. The passive wireless power transferring system may be enabled by a switch component (e.g., RF switch, switch matrix, etc.) that may cause a received signal to be converted (e.g., using a rectifying circuit) to direct current (DC) voltage (e.g., energy) when in a first state and, when in a second state, cause the received signal to be redirected (e.g., reflected) back to the free space as it sees the high impedance at the switch terminal. In this way, RF signals may be selectively harvested according to the energy needs of a particular reception target, while unharvested signals may be redirected to other targets in an area. This reduces energy waste and increases the range of RF harvesting techniques by enabling originating transmitting sources to supply RF energy to targets outside their lines of sight.

Some of the techniques of the present disclosure may be applied to any ecosystem of RF-enabled devices including, as examples, airborne ecosystems in which low weight aircraft, such as unmanned aerial vehicle (UAV), may use RF energy harvesting techniques to reduce power storage requirements. The techniques of the present disclosure support effective airborne RF energy relays that redirect and/or retransmit RF energy. In this way, the techniques of the present disclosure allow for longer range transmission to targets beyond the line of sight of an initial ground transmitter. The energy relaying techniques described herein enable a first reception target to efficiently collect a portion of incoming energy and selectively focus and redirect other portions of energy into tight outgoing beams toward other targets within an airspace.

FIG. 1 illustrates an example energy relay ecosystem 100, in accordance with some embodiments of the present disclosure. In some embodiments, the energy relay ecosystem 100 includes a base station 102, a reception target 104, one or more reflection targets 106A-D (collectively referred to as reflection targets 106).

In some embodiments, the base station 102 includes an initial ground transmitter of a plurality of RF energy signals 110. For example, the base station 102 may be one originating source of RF energy signals 110. The RF energy signals 110 may be transmitted to one or more different targets to supply energy to the targets. The targets may be airborne targets, ground targets, aquatic targets, underwater targets, and/or the like. In some embodiments, the base station 102 may include a ground station with antenna circuitry that is configured to emit the plurality of RF energy signals 110. The base station 102 may be stationary and/or mounted to a mobile platform. By way of example, the base station 102 may be mounted to watercraft (e.g., boats, ships, etc.), ground vehicles (e.g., motor vehicles, cars, etc.), underwater craft (e.g., submarines, etc.), spacecraft (e.g., satellites, rockets, etc.), aircraft (e.g., UAVs, etc.), and/or the like.

In some embodiments, the reception target 104 is an object that receives the RF energy signals 110 from the base station 102 and/or one or more other objects, such as the reflection targets 106A-D. The base station 102 may directly or indirectly target the reception target 104. For example, the base station 102 may intelligently direct (e.g., using one or more beam steering techniques, phased antenna arrays, etc.) the RF energy signals 110 to a position and/or expected position of the reception target 104. In addition, or alternatively, the base station 102 may generally emit the plurality of RF energy signal 110 for reception by any entities within a general area of the RF energy signal 110.

The reception target 104 may include an RF-enabled device that is mounted, affixed, and/or the like to any type of vehicle. The reception target 104, for example, may include one or more watercraft (e.g., boats, ships, etc.), ground vehicles (e.g., motor vehicles, cars, etc.), underwater craft (e.g., submarines, etc.), spacecraft (e.g., satellites, rockets, etc.), aircraft (e.g., UAVs, etc.). In some examples, the reception target 104 may include an aerial vehicle. For example, the reception target 104 may include a lightweight UAV that is equipped with limited electronics to minimize the size and weight of the UAV. To accommodate size and weight restrictions, the reception target 104 may utilize RF energy harvesting techniques to harvest power from RF energy signals 110 provided by the base station 102 or any other entity (e.g., reflection targets 106A-D, etc.). This may allow the reception target 104 to reduce energy storage components (e.g., batteries, etc.) without negatively impacting the performance (e.g., range, flight time, etc.) of the reception target 104.

In some embodiments, the reflection targets 106A-D include one or more objects that receive the RF energy signals 110 relayed by the reception target 104. The reception target 104, for example, may receive the RF energy signals 110 from the base station 102 and reflect at least a portion of the RF energy signals 110 to one or more of the reflection targets 106A-D. The reception target 104 may directly or indirectly target one of the reflection target 106A-D. For example, the reception target 104 may intelligently direct (e.g., using one or more beam steering techniques, phased antenna arrays, etc.) the RF energy signals 110 to a position and/or expected position of at least one of the reflection targets 106A-D. In addition, or alternatively, the base station 102 may generally reflect the plurality of RF energy signals 110 for reception by any of the reflection target 106A-D within a general direction of the RF energy signal 110.

The reflection targets 106A-D may each include RF-enabled devices that are mounted, affixed, and/or the like to any type of vehicle. The reflection targets 106A-D, for example, may include one or more watercraft (e.g., boats, ships, etc.), ground vehicles (e.g., motor vehicles, cars, etc.), underwater craft (e.g., submarines, etc.), spacecraft (e.g., satellites, rockets, etc.), aircraft (e.g., UAVs, etc.), and/or the like. In some examples, the reflection targets 106A-D may include an aerial vehicle. For example, the reflection targets 106A-D may include a lightweight UAV that is equipped with limited electronics to minimize the size and weight of the UAV. To accommodate size and weight restrictions, the reflection targets 106A-D may utilize RF energy harvesting techniques to harvest power from RF energy signals 110 provided by the reception target 104 or any other entity (e.g., another reflection target 106, a base station 102, etc.). This may allow the reflection targets 106A-D to reduce energy storage components (e.g., batteries, etc.) without negatively impacting the performance (e.g., range, etc.) of the reflection targets 106A-D.

The unidirectional relay system described above is only one example embodiment of the present disclosure. In some examples, the entities of FIG. 1 may form a multi-directional relay system in which the base station 102, the reception target 104, and/or the reflection targets 106A-D may each transfer RF energy signals among one another in any direction. For example, each of the reception target 104 and/or the reflection targets 106A-D may be configured to transmit and receive RF energy signals. By way of example, at least one of the reflection targets 106A-D may receive RF energy signals from another reflection target and/or the reception target 104 and relay at least a portion of the RF energy signals to the reception target 104. In such a case, the reception target 104 may receive the plurality of RF energy signals 110 from the at least one of the reflection targets 106. In this manner, a plurality of entities may effectively share RF energy signals depending on the energy needs of each system.

Figure 2:
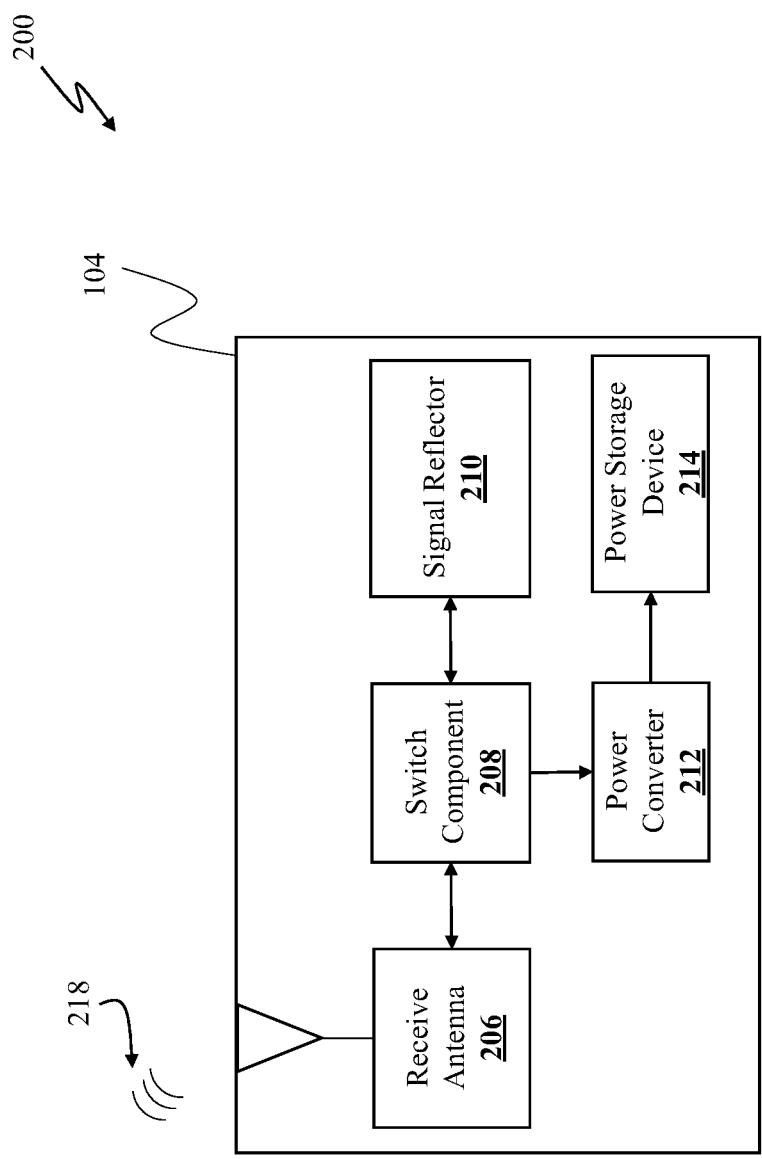
FIG. 2 illustrates an exemplary system diagram for selectively reflecting RF energy signals, in accordance with some embodiments of the present disclosure.
Figure 2:
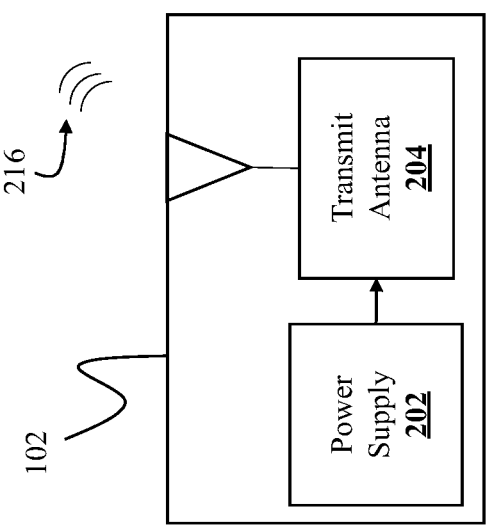

FIG. 2 illustrates an exemplary system diagram 200 for selectively reflecting RF energy signals, in accordance with some embodiments of the present disclosure. The system diagram 200 depicts the flow of data between electrical components of multiple objects including, as examples, the base station 102 and/or the reception target 104. As described herein, the base station 102 may emit a plurality of RF energy signals for reception by the reception target 104. The reception target 104 may receive the RF energy signals and, in some circumstances, reflect the signals to one or more other objects.

In some embodiments, the base station 102 includes a power supply 202 and/or a transmitting antenna unit 204. The power supply 202, for example, may include a power amplifier. The power amplifier may be configured to supply energy signals to the transmitting antenna unit 204 to emit an RF signal 216 to the reception target 104.

In some embodiments, the reception target 104 includes a receiving antenna unit 206 configured to receive the RF signal 216 and/or one or more electronic components for processing the RF signal 216. In some examples, the electrical components may include one or more switch components 208, signal reflectors 210, power converters 212, power storage components 214, and/or any other electrical component configured to collect and/or reflect energy from the RF signal 216. In addition, or alternatively, the electrical components may include signal processing circuitry, such as analog to digital converters, analog signal processing circuits, digital to analog converters, digital signal processing integrated circuits, and/or the like.

In some embodiments, the switch component 208 is a radio frequency switch configured to direct the RF signal 216 to one or more different components of the reception target 104. The switch component 208 may include any type of electronic switch, such as a single pole single throw (SPST) switch with two terminals, a single throw double throw (SPDT) and/or any arbitrary number of throws (SPNT), a double pole double throw (DPDT) switch with two pairs of terminals, a rotary transfer switch, and/or the like. In some embodiments, the switch component 208 is an SPDT switch. In addition, or alternatively, the switch component 208 may include a switch matrix.

In some embodiments, the switch component 208 is electrically coupled to the receiving antenna unit 206. The switch component 208 may be associated with a plurality of signal processing states. The plurality of signal processing states may include at least one collection state and at least one reflection state. The switch component 208 may selectively route the RF signal 216 from the receiving antenna unit 206 to one or more components of the reception target 104 based at least in part on a current state of the switch component 208.

By way of example, the switch component 208 may include at least two terminals. A first terminal may direct the RF signal 216 to the power converter 212 and a second terminal may direct the RF signal 216 to a signal reflector 210. When the switch component 208 is open (e.g., in a collection state, an "ON" state, etc.) the RF signal 216 may be directed to the power converter 212, whereas when the switch component 208 is closed (e.g., in a reflection state, an "OFF" state, etc.) the RF signal 216 may be directed to the signal reflector 210. In this way, the RF signal 216 may be selectively harvested (e.g., using the power converter 212) and/or redirected (e.g., using signal reflector 210) depending on the state of the switch component 208. In some examples, the switch component 208 may have a default state. The default state may be open such that energy may be harvested from received RF signals unless the switch component 208 is thrown (e.g., opened, etc.). For example, the switch may be closed when not energized and opened when energized and/or vice versa.

In some embodiments, the signal reflector 210 includes one or more phase shifter modules, delay line circuits, and/or the like that are configured to generate a reflected signal 218 based at least in part on the RF signal 216. The phase shifters, for example, may include any type of analog, digital, active, and/or passive RF phase shifter configured to change a transmission phase angle of the RF signal. The delay line circuits may include any type and/or number of passive and/or active delay lines configured to change the transmission phase angle of the RF signal by delaying one or more portions of the signal during retransmission. For example, the receiving antenna unit 206 may include an antenna array with a plurality of antenna elements. By changing the phase and/or delaying the transmission from one or more elements of the antenna array, the signal reflector 210 may steer the transmitted RF energy in a particular direction (e.g., as opposed to directly back to the base station 102). In this way, the signal reflector 210 may generate a reflected RF signal that may be received by one or more other targeted objects.

In some embodiments, the power converter 212 includes a rectifier and/or the like that is configured to convert the reflected signal 218 to energy for storage. For example, the power converter 212 may include an RF rectifier circuit configured to harvest energy from the RF signal 216 by converting the RF signal 216 to direct current (DC) power. The power converter 212 may include any type of rectifier circuit including, for example, single diodes, voltage multipliers, bridges of diodes, and/or the like.

In some embodiments, the power storage component 214 includes a power bank and/or the like that is configured to store energy for the reception target 104. By way of example, the power storage component 214 may include a DC power supply.

Figure 3:
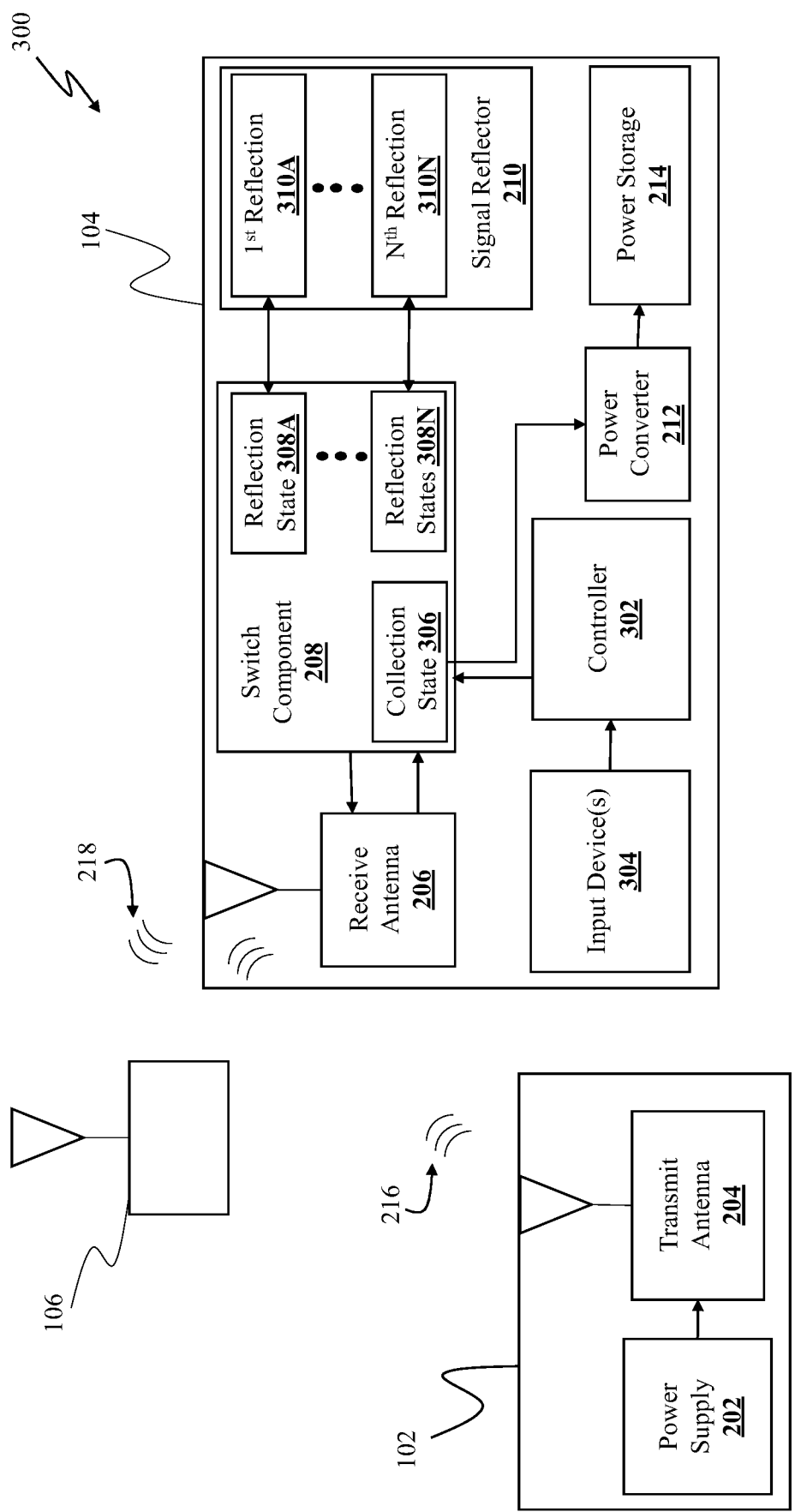
FIG. 3 illustrates an exemplary system diagram for selectively reflecting RF energy signals, in accordance with some embodiments of the present disclosure.

FIG. 3 illustrates an exemplary system diagram 300 for selectively reflecting RF energy signals, in accordance with some embodiments of the present disclosure. The system diagram 300 depicts the detailed data flow for reflecting an RF signal 216 from base station 102 to a reflection target 106. As described herein, the base station 102 may emit a plurality of RF energy signals for reception, harvesting, and/or retransmission by the reception target 104.

For example, the base station 102 may include a power supply 202 and/or transmitting antenna unit 204 collectively configured to emit the RF signal 216 to the reception target 104. The reception target 104 may include receiving antenna unit 206 and/or electronic components for processing the RF signal 216 to collectively receive, harvest, and/or selectively retransmit a reflected signal 218 to a reflection target 106. The electrical components, for example, may include one or more switch components 208, signal reflectors 210, power converters 212, power storage components 214, and/or any other electrical component configured to collect and/or reflect energy from the RF signal 216.

In some embodiments, the electrical components include a controller 302 and/or one or more input devices 304. The controller 302 may be configured to selectively transition the switch component 208 between the collection state 306 (e.g., state 0, etc.) and/or one or more reflection states 308A-N (e.g., states 1-N, etc.) based at least in part on one or more power transfer stimuli. For example, the controller 302 may include processing circuitry (e.g., integrated circuits, microprocessors, etc.) configured to control the switch component 208 based at least in part on input data received from the one or more input devices 304. The controller 302 may be configured to execute a state transition model to detect at least one power transfer stimuli based at least in part on the input data and select a particular state for the switch component 208 based at least in part on the detected power transfer stimuli.

As described herein, the input devices 304 may include one or more sensors, communication interfaces, and/or the like that are configured to generate input data tailored to the state transition model. The state transition model may include a smart algorithm configured to process the input data to detect a power transfer stimulus and select a particular state of the switch component 208 corresponding thereto. The smart algorithm may be implemented in a computer readable memory and/or designed into one or more circuits of the controller 302.

In some embodiments, the switch component 208 is configured to route the RF signal 216 to the power converter 212 in the collection state 306 and/or route the RF signal 216 to the signal reflector 210 in the one or more reflection states 308A-N. For example, the switch component 208 may include a plurality of signal processing states. In addition to the collection state 306, the plurality of signal processing states may include one or more reflection states 308A-N. The reflection states 308A-N may include any number of different states. Each reflection state may identify a different phase shift and/or delay of a reflected signal 218, such that each reflection state may cause the reflected signal 218 to be transmitted in a different direction relative to the reception target 104. The number of reflection states may be based at least in part on a number of desired directions for retransmitting an RF signal 216. In this manner, the RF signal 216 may be reflected in a specific direction, for example, to target the reflection target 106.

By way of example, the reflection states 308A-N may include at least a first reflection state 308A and/or a second reflection state 308N.

When in the first reflection state 308A, the switch component 208 may direct the RF signal 216 to a first reflection component 310A of the signal reflector 210. The first reflection component 310A may include a first delay line circuit (and/or phase shifter, etc.) corresponding to the first reflection state 308A. The first delay line circuit may be configured to generate a first reflected electrical signal (e.g., analog, digital, etc.) for retransmitting a reflected signal 218 in a first direction. By way of example, the first delay line circuit may be predetermined to modify an analog signal by a first angle (e.g., relative to an incoming angle of the RF signal 216).

When in the second reflection state 308N, the switch component 208 may direct the RF signal 216 to a second reflection component 310N of the signal reflector 210. The second reflection component 310N may include a second delay line circuit (and/or phase shifter, etc.) corresponding to the second reflection state 308N. The second delay line circuit may be configured to generate a second reflected electrical signal (e.g., analog, digital, etc.) for retransmitting a reflected signal 218 in a second direction that is different from the first direction. By way of example, the second delay line circuit may be predetermined to modify an analog signal by a second angle (e.g., relative to an incoming angle of the RF signal 216).

The controller 302 may intelligently select (and/or control) a state of the switch component 208 based at least in part on external environment data and/or internal system data generated by the input devices 304. For example, the input devices 304 may include one or more internal sensors configured to generate internal system data. In addition, or alternatively, the input devices 304 may include one or more external sensors configured to generate external environment data.

The internal sensors, for example, may include one or more temperature sensors, power sensors, location sensors, and/or the like.

In some examples, the internal system data may include energy data for the reception target 104 that is indicative of an energy level for the reception target 104. The energy level may be indicative of an amount of stored energy for the reception target 104. The amount of stored energy may be represented as a range (e.g., operating time, such as a flight time, etc., operating distance, such as an estimated flight distance, etc., and/or the like), a percentage of the power capacity for the power storage component 214, and/or the like.

In some examples, the internal system data may include location data for the reception target 104. The location data may be indicative of a position, orientation, travel direction, and/or like for the reception target 104. By way of example, the one or more internal sensors may include one or more global positioning systems, inertial measurement units, and/or the like that are configured to identify a local position of the reception target 104.

The external sensors, for example, may include one or more entity position detectors, such as RF detectors, photodetectors, proximity sensors, and/or the like that may detect a position of one or more reflection targets relative to the reception target 104.

In some examples, the external environment data may include entity location data indicative of a position of one or more reflection targets. The position may include an external position relative to the local position of the reception target 104. The external position may include one or more coordinates, angles, and/or the like that may describe a relative position of a reflection target 106. The entity location data may be based at least in part on the detection of one or more RF signals (e.g., via the RF detectors, etc.), infrared signals (e.g., via the proximity sensors, etc.), light signals (e.g., via the photodetectors, etc.), and/or any other signals indicative of a relative location of an object.

In some examples, the input devices 304 may include one or more network and/or communications interfaces for communicating with various computing entities, such as by communicating data, content, information, and/or similar terms used herein interchangeably that may be transmitted, received, operated on, processed, displayed, stored, and/or the like. In some examples, the external environment data may be received from one or more computing entities, such as the base station 102, the reflection target 106, and/or the like.

In some embodiments, a power transfer stimulus is based at least in part on the internal system data. In some examples, the power transfer stimulus may be based at least in part on a power capacity of the power storage component. For instance, the power transfer stimulus may be based at least in part on an energy threshold for the reception target 104. The energy threshold may be indicative of a threshold amount of stored energy for the reception target 104. By way of example, the energy threshold may define a threshold range, a threshold percentage of the power capacity, and/or the like. In some examples, the power transfer stimulus may be detected based at least in part on a comparison between the energy level of the power storage component 214 and the energy threshold.

The power transfer stimulus, for example, may be detected in the event that the energy level of the power storage component 214 is at or below the energy threshold. For example, the controller 302 (e.g., using the state transition model) may detect the power transfer stimulus in the event that the energy level of the power storage component 214 is at or below the energy threshold. In response to the power transfer stimulus, the controller 302 may select and/or transition the switch component 208 to the collection state 306.

In some embodiments, a power transfer stimulus is based at least in part on the external environment data. In some examples, the power transfer stimulus may be based at least in part on a presence and/or location of an external entity, such as the reflection target 106. For instance, the power transfer stimuli may be based at least in part on the entity position for the reflection target 106. As one example, the power transfer stimulus may be indicative of a presence of the reflection target 106 within a proximity threshold to the reception target 104. For example, the proximity threshold may be based at least in part on a range of the RF signal 216. The proximity threshold, for example, may include a threshold offset angle, threshold distance, and/or the like that defines a maximum potential reflection angle and/or distance of a reflected signal 218. In some examples, the power transfer stimulus may be detected based at least in part on a comparison between the local position of the reception target 104, the external position of the reflection target 106, and/or the proximity threshold.

The power transfer stimulus, for example, may be detected in the event that the local position of the reception target 104 and the external position of the reflection target 106 are at and/or within the proximity threshold. For example, the controller 302 (e.g., using the state transition model) may detect the power transfer stimulus in the event that the local position and the external position are at and/or within the proximity threshold. In response to the power transfer stimulus, the controller 302 may select and/or transition the switch component 208 to at least one of the reflection states 308A-N.

In some examples, the controller 302 (e.g., using the state transition model) may transition the switch component 208 to at least one of the reflection states 308A-N in response to detecting: (i) a first power transfer stimulus indicating that the energy level satisfies (e.g., is greater than) the energy threshold and (ii) a second power transfer stimuli indicating that a reflection target 106 is within the proximity threshold.

In some examples, the controller 302 may be configured to selectively transition the switch component 208 to a particular state of the reflection states 308A-N based at least in part on the external environment data. For example, the controller 302 may transition the switch component 208 to the first reflection state 308A and/or the second reflection state 308N based at least in part on the external environment data. By way of example, the controller 302 may be configured to selectively transition the switch component 208 to the first reflection state 308A and/or the second reflection state 308N based at least in part on the position of the reflection target 106. The controller 302 may select a particular one of the reflection states 308A-N to generate a reflected signal 218 that is reflected at a particular angle towards the external position of the reflection target 106.

In some embodiments, the controller 302 includes signal processing circuitry configured to use a signal processing model to select at least one of the plurality of signal processing states. For example, the signal processing model may include a beamforming model, a direction finding algorithm, and/or the like that is configured to determine one or more phase shifts, transmission delays, and/or the like to transmit a reflected signal 218 at a specific angle towards the reflection target 106. The controller 302 may leverage the signal processing model to identify a particular reflection component of the signal reflector 210 capable of reflecting the RF signal 216 at an angle between the local position of the reception target 104 and the external position of the reflection target 106 (e.g., by modifying the phase and/or timing, etc.). The controller 302 may transition the switch component 208 to a particular reflection state that corresponds to the particular reflection component.

In some embodiments, antenna unit 204 is configured to transmit the reflected signal 218. For instance, in response to detecting a first reflection target at a first position, the controller 302 may transition the switch component 208 to the first reflection state 308A to generate a first reflected electrical signal to transmit an RF energy signal in a first direction towards the first reflection target. The antenna unit 204 may emit a first reflected signal to the first reflection target based at least in part on the first reflected electrical signal. As another example, in response to detecting a second reflection target at a second position, the controller 302 may transition the switch component 208 to the second reflection state 308N to generate a second reflected electrical signal to transmit an RF energy signal in a second direction towards the second reflection target. The antenna unit 204 may emit a second reflected signal to the second reflection target based at least in part on the second reflected electrical signal. In this way, the controller 302 may leverage various states of the switch component 208 to selectively retransmit RF energy signals to any of a plurality of targets.

Figure 4:
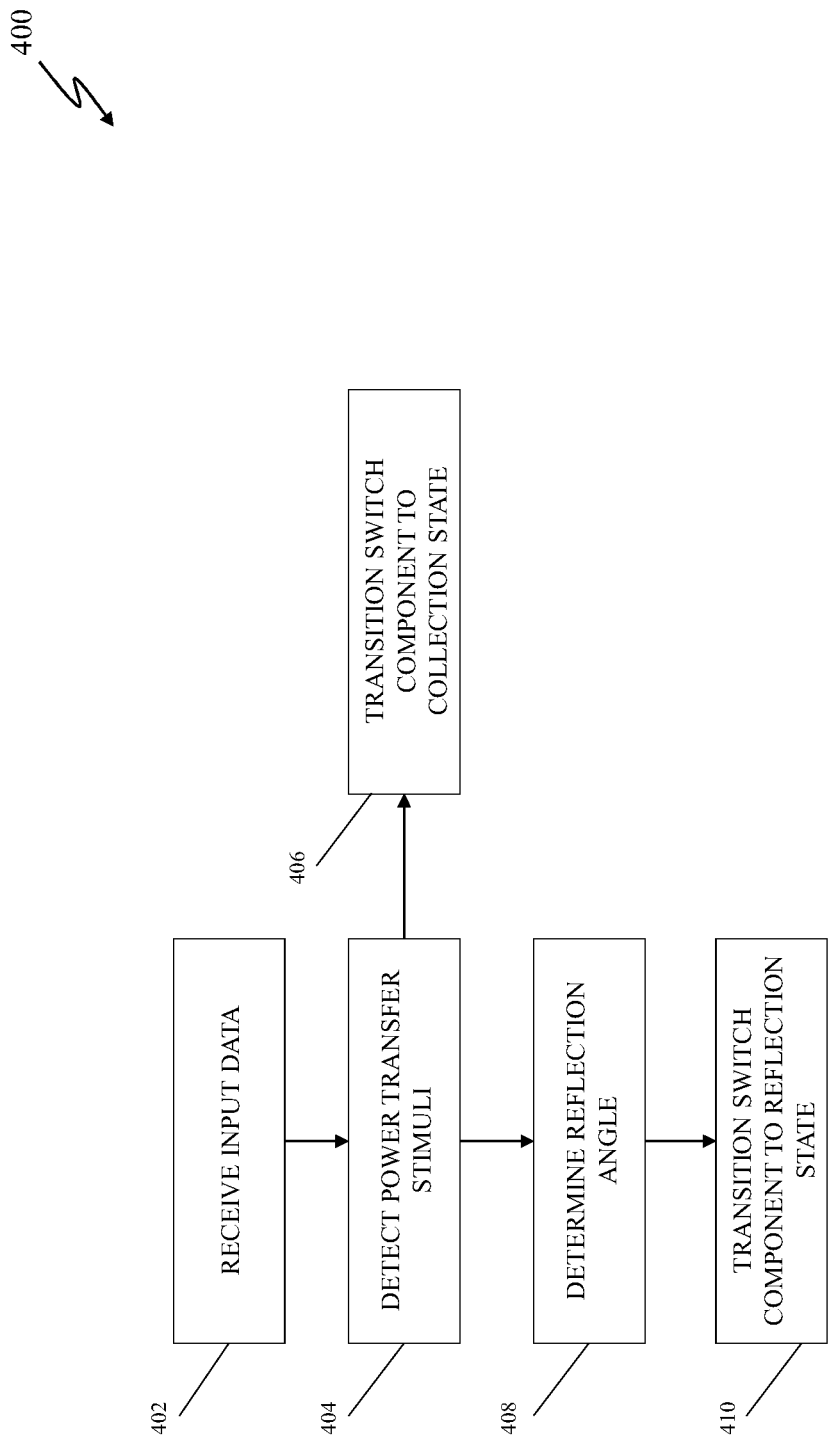
FIG. 4 illustrates a flowchart depicting an example process for handling RF energy signals, in accordance with some embodiments of the present disclosure.

FIG. 4 illustrates a flowchart depicting an example process 400 for handling RF energy signals, in accordance with some embodiments of the present disclosure. In some examples, the example process 400 may be performed by various computing system components (for example, but not limited to, controller 302 described above with regard to FIG. 3). In some examples, the computing system components may include processing circuitry that may be electrically coupled to and/or in electronic communication with other circuitries, such as, but not limited to, one or more antenna units, switching components, input devices, and/or the like.

In some embodiments, the process 400 includes, at step/operation 402, receiving input data. For example, the computing system component may be configured to receive input data from one or more input devices. For instance, the computing system component may receive, via the one or more input devices, input data for a state transition model. The state transition model may include a smart algorithm configured to detect one or more power transfer stimuli for modifying a signal processing state of a switch component as described herein.

For example, the input data may include internal system data and/or external environmental data. The internal system data may include energy data that is indicative of an energy level for an RF-enabled device, as described herein. In addition, or alternatively, the internal system data may include location data indicative of a local position of the RF-enabled device, as described herein. The external environmental data may include entity location data indicative of a position of one or more reflection targets. The position may include an external position relative to the local position of the reception target 104, as described herein. In this way, the input data may be indicative of a local position of the RF-enabled device and an external position of an external reflection target.

In some embodiments, the process 400 includes, at step/operation 404, detecting a power transfer stimulus. For example, the computing system component may be configured to detect a power transfer stimulus based at least in part on the input data. For instance, the computing system component may detect, using the state transition model, at least one power transfer stimuli for the RF-enabled device. The RF-enabled device, for example, may be associated with a reception target configured to receive an RF energy signal from a base station, a reflection target, and/or the like, as described herein. The at least one power transfer stimuli may include at least one of a plurality of power transfer stimuli that may inform a decision to harvest energy from the RF energy signal or retransmit (e.g., redirect, reflect, etc.) the RF energy signal to another target, such as the reflection targets described herein.

The at least one power transfer stimuli may be based at least in part on (i) an energy threshold for the RF-enabled device and/or (ii) a proximity threshold between the RF-enabled device and an external reflection target. For example, the energy threshold may be indicative of a threshold amount of stored energy for the reception target 104, as described herein. As another example, the proximity threshold may be indicative of a threshold offset angle, threshold distance, and/or the like, as described herein.

In some embodiments, the process 400 includes, at step/operation 406, transitioning a switch component to a collection state. For example, the computing system component may be configured to transition the switch component to the collection state based at least in part on the detected power transfer stimuli. For instance, the computing system component may transition the switch component to the collection state in response to a power transfer stimulus indicating that an energy level of the RF-enabled device is at and/or below the energy threshold. By way of example, the input data may be indicative of an energy level of the RF-enabled device. The particular state of the switch component may be determined based at least in part on a comparison between the energy level and the energy threshold for the RF-enabled device. In the event that the energy level is at or below the energy threshold, the switch component may be transitioned to the 072951/590586 collection state at step/operation 406. In the event that the energy level is above the energy threshold, the process 400 may proceed to step/operation 408.

The collection state may cause the RF-enabled device to harvest an RF energy signal. By way of example, the collection state may cause the RF-enabled device to convert a received RF signal to energy. As one example, the collection state may cause the switch component to direct the RF energy signal to a power converter, such as a rectifier circuit as described herein. The power converter may convert the RF energy signal to DC energy for storage by an internal power storage component of the RF-enabled device.

In some embodiments, the process 400 includes, at step/operation 408, determining a reflection angle for an RF energy signal. For example, the computing system component may be configured to determine the reflection angle for the RF energy signal based at least in part on a signal processing model. The signal processing model, for example, may include a beamforming model, a direction finding algorithm, and/or the like, as described herein. The computing system component may determine, using a direction finding model, the reflection angle for the received RF signal based at least in part on the local position of the RF device, the external position of a reflection target, an incoming angle of the RF energy signal, and/or any other parameters associated with the direction finding model.

In some embodiments, the process 400 includes, at step/operation 410, transitioning the switch component to a reflection state. For example, the computing system component may be configured to transition the switch component to the reflection state based at least in part on the reflection angle. The reflection state may cause the RF-enabled device to reflect the received RF signal to the external reflection target. By way of example, the reflection state may cause the RF-enabled device to modify the received RF signal to generate a reflected RF signal that may be retransmitted by an antenna unit of the RF-enabled device. As one example, the reflection state may cause the switch component to direct the RF energy signal to a signal reflector, such as a phase shifter, delay line circuit, and/or the like, as described herein.

The reflection state may be selected from a plurality of reflection states of the switch component based at least in part on the reflection angle. For example, each reflection state may correspond to a different signal reflection component configured to redirect the RF energy signal at a different angle. The computing system component may be configured to transition the switch component to the reflection state that corresponds to the reflection angle. In this way, the computing system component may selectively reflect a received RF energy signal to directly target one or more reflection targets within the reception target's proximity.

Example Systems and Apparatuses

Figure 5:
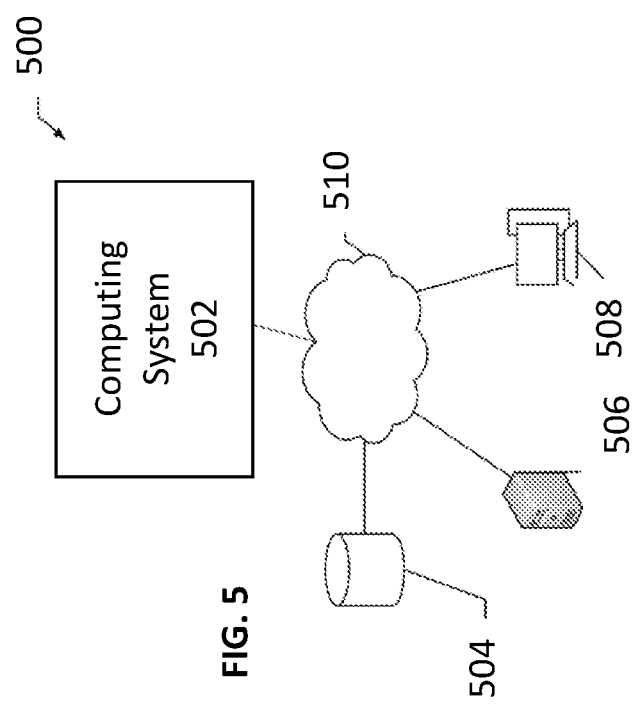
FIG. 5 is a schematic diagram depicting an example system, in accordance with some embodiments of the present disclosure.

FIG. 5 is a schematic diagram depicting an example system 500 in accordance with various embodiments of the present disclosure is provided. As depicted, the example system 500 includes a computing system 502, one or more computing entities 506 (e.g., servers), one or more databases 504, one or more networks 505, one or more user computing entities 508, and/or the like. In various examples, the system 500 may operate to receive, transmit, and/or reflect radio signals among a plurality of RF-enabled devices, such as one or more base stations, RF reception targets, RF reflection targets, and/or the like.

The computing system 502 may include a plurality of computing devices (e.g., RF-enabled devices). Each computing device may include at least one processor and at least one memory coupled to the at least one processor. For example, at least one processor and the at least one memory coupled to the at least one processor may be included in an antenna system (e.g., circuit chips) of the computing device(s).

In some embodiments, the antenna system includes an antenna array with an antenna board (e.g., a printed circuit board (PCB)) and a plurality of antenna units. The antenna units may include an antenna element, an antenna circuit chip, one or more ports, and/or the like. The one or more ports, for example, may include a power and control port (e.g., SAMTEC stacker), a radio frequency (RF) port (e.g., MMSP (Micro-Mode) connector, Corning G4PO connectors, etc.), and/or the like. Examples of the MMSP connector include, but are not limited to, MMSP-3526, MMSP-3268 and MMSP-3514. The antenna array may operate within one or more of a X-Band range, Ku-Band range, K-Band range, Ka-Band range, V-Band range, W-Band frequency range, and/or the like. In some examples, when the antenna array operates at a given frequency, the antenna array may select one or more of the antenna units to perform the desired operations (e.g., transmit radio waves and/or receive radio waves). The antenna units may be specifically configured to operate at a particular radio wave frequency and/or wavelength.

An antenna unit may be coupled to an antenna circuit chip that includes a subset or all of an RF front end (i.e., a transmitter/receiver chip). The RF front end may include an RF transmitter front end and/or an RF receiver front end. In some examples, the RF front end of an antenna circuit chip may generate one or more electrical signals to drive the antenna elements of the antenna unit to emit electromagnetic waves in space. Conversely, in some embodiments, the antenna elements of the antenna unit receive one or more electromagnetic waves from free space and converts the electromagnetic waves to an RF electrical signal that may be processed by the RF front end on the antenna circuit chip (e.g., to convert the electrical signal to energy, reflect the electrical signal, etc.).

In some embodiments, one or more components of an RF front end (e.g., a signal reflector, etc.) are configured to adjust phase, time delay, and/or relative magnitudes of different signals. For example, an antenna circuit chip including an RF front end may include one or more of: low pass filters (LPF), intermediate frequency (IF) filters, power amplifiers, oscillators, mixers, digital-to-analog converters (DAC), and analog-to-digital converters (ADC), and/or the like. In some examples, the antenna circuit chip includes a power management integrated circuit (PMIC) and/or a baseband circuit (e.g., a power storage component, etc.) in addition to the RF front end. The PMIC may be configured to manage power for the antenna unit. The baseband circuit may be configured to provide low frequency signals that carry information to be transmitted by the antenna element(s) of the antenna unit and process low frequency signals converted from RF signals received by the antenna element(s).

In some embodiments, the antenna circuit chip includes an amplifier chip, such as a power amplifier, a low noise amplifier, and/or the like.

The computing system 502 (and/or one or more computing devices thereof) may be in electronic communication with one or more databases 504, one or more computing entities 506, and/or one or more user computing entities 508 over one or more networks 510 such that they may exchange data (e.g., receive and transmit data) with one another (e.g., periodically and/or in response to requests). Each of the components of the system 500 may be in communication with one another over the same or different wireless or wired networks including, for example, a wired or wireless Personal Area Network (PAN), Local Area Network (LAN), Metropolitan Area Network (MAN), Wide Area Network (WAN), cellular network, and/or the like. While FIG. 5 illustrates certain system components as separate, stand-alone devices, the various embodiments are not limited to this particular architecture.

As depicted in FIG. 5, the example system 500 includes one or more computing entities 506. In general, the terms computing device, entity, device, system, and/or similar words used herein interchangeably may refer to, for example, one or more computers, computing devices, computing entities, desktop computers, mobile phones, tablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In some embodiments, these functions, operations, and/or processes may be performed on data, content, information, and/or similar terms used herein interchangeably.

In some examples, the computing entities 506 may one or more network and/or communications interfaces for communicating with various computing entities, such as by communicating data, content, information, and/or similar terms used herein interchangeably that may be transmitted, received, operated on, processed, displayed, stored, and/or the like.

In some examples, the computing entities 506 may include or be in communication with non-volatile media (also referred to as non-volatile storage, memory, memory storage, memory circuitry and/or similar terms used herein interchangeably). For example, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In some examples, the computing entities 506 may include or be in communication with volatile media (also referred to as volatile storage, memory, memory storage, memory circuitry and/or similar terms used herein interchangeably). For example, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like may be used to control certain aspects of the operation of the computing entities 506 with the assistance of the processing element and the operating system.

In some examples, the computing entities 506 may include one or more network and/or communications interfaces for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entities 506 may be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 9× (9×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.99 (Wi-Fi), Wi-Fi Direct, 802.96 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entities 506 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 506 components may be located remotely from other computing entity components, such as in a distributed system. Furthermore, one or more of the components may be aggregated and additional components performing functions described herein may be included in the computing entities 506. Thus, the computing entities 506 may be adapted to accommodate a variety of needs and circumstances, such as including various components described with regard to a mobile application executing on the user computing entity 508, including various input/output interfaces.

In some examples, the system 500 may include a user computing entity 508. The user computing entity 508 may be or include one or more mobile devices, wearable computing devices, and/or the like. An example user computing entity 508 may include an antenna, a transmitter (e.g., radio), a receiver (e.g., radio), and a processing element that provides signals to and receives signals from the transmitter and receiver, respectively. The signals provided to and received from the transmitter and the receiver, respectively, may include signaling information/data in accordance with an air interface standard of applicable wireless systems to communicate with various devices, such as a computing entity (e.g., central server), another user computing entity 508, and/or the like. In some examples, the transmitter and/or receiver are configured to communicate via one or more SRC protocols. For example, the transmitter and/or receiver may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In some examples, the antenna, transmitter, and receiver may be configured to communicate via one or more long range protocols, such as GPRS, UMTS, CDMA200, 9×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 508 may also include one or more network and/or communications interfaces for communicating with various computing entities, such as by communicating data, content, information, and/or similar terms used herein interchangeably that may be transmitted, received, operated on, processed, displayed, stored, and/or the like. In this regard, the user computing entity 508 may be capable of operating with one or more air interface standards, communication protocols, modulation types, and access types. More particularly, the user computing entity 508 may operate in accordance with any of a number of wireless communication standards and protocols. In some examples, the user computing entity 508 may operate in accordance with multiple wireless communication standards and protocols, such as GPRS, UMTS, CDMA200, 9×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 508 may communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 508 may also download changes, add-ons, and updates, for instance, to its firmware, software (e.g., including executable instructions, applications, program modules), and operating system.

The user computing entity 508 may include a user interface device comprising one or more user input/output interfaces (e.g., a display and/or speaker/speaker driver coupled to a processing element and a touch interface, keyboard, mouse, and/or microphone coupled to a processing element). For example, the user interface may be configured to provide a mobile application, browser, interactive user interface, dashboard, webpage, and/or similar words used herein interchangeably executing on and/or accessible via the user computing entity 508 to cause display or audible presentation of information/data and for user interaction therewith via one or more user input interfaces. Moreover, the user interface may include or be in communication with any of a number of devices allowing the user computing entity 508 to receive information/data, such as a keypad (hard or soft), a touch display, voice/speech or motion interfaces, scanners, readers, or other input device. In embodiments including a keypad, the keypad may include (or cause display of) the conventional numeric (0-9) and related keys (#, *), and other keys used for operating the user computing entity 508 and may include a full set of alphabetic keys or set of keys that may be activated to provide a full set of alphanumeric keys. In addition to providing input, the user input interface may be used, for example, to activate or deactivate certain functions, such as screen savers and/or sleep modes. Through such inputs the user computing entity 508 may capture, collect, store information/data, user interaction/input, and/or the like.

The user computing entity 508 may also include volatile storage or memory and/or non-volatile storage or memory, which may be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory may store databases, database instances, database management system entities, information/data, applications, programs, program modules, scripts, source code, object code, byte code, compiled code, interpreted code, machine code, executable instructions, and/or the like to implement the functions of the user computing entity 508.

Any two or more of the illustrative components of the system 500 of FIG. 5 may be configured to communicate with one another via one or more networks 510. The networks 510 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 510 may have any suitable communication range associated therewith and may include, for example, global networks (e.g., the Internet), MANs, WANs, LANs, or PANs. In addition, the networks 510 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 5 provides an example system 500, it is noted that the scope of the present disclosure is not limited to the example shown in FIG. 5. In some examples, the system 500 may include one or more additional and/or alternative elements, and/or may be different from that illustrated in FIG. 5.

Figure 6:
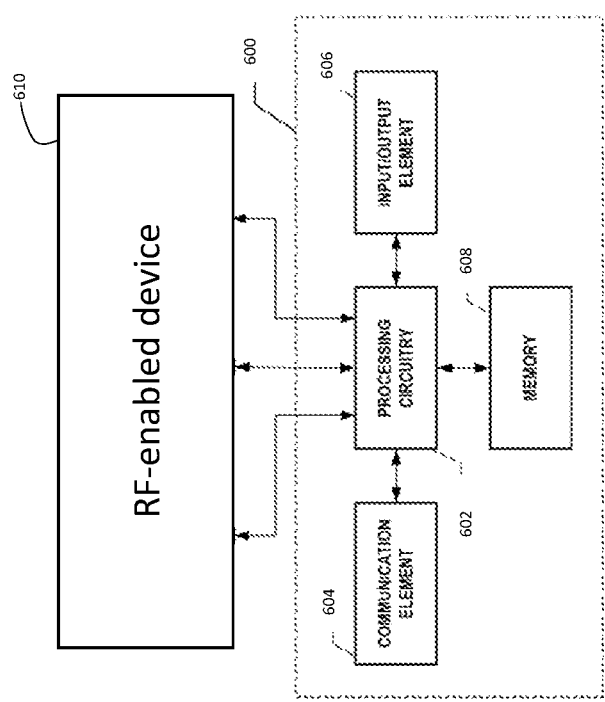
FIG. 6 is a schematic diagram depicting an example controller in electronic communication with an RF-enabled device, in accordance with some embodiments of the present disclosure.

Referring now to FIG. 6, a schematic diagram depicting an example controller 600 in electronic communication with a RF-enabled device 610 in accordance with various embodiments of the present disclosure is provided. As shown, the controller 600 includes processing circuitry 602, a communication element 604, input/output element 606, a memory 608 and/or other components configured to perform various operations, procedures, functions or the like described herein.

In some embodiments, the controller 600 may be or comprise a printed circuit board (PCB). In some examples, the controller 600 may further comprise one or more user interfaces, one or more protection circuits, configuration management circuitry, a wireless interface, an interface connector, power control circuitry, and/or the like.

The processing circuitry 602 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 6 as a single processor, in an embodiment, the processing circuitry 602 may include a plurality of processors and signal processing modules. The plurality of processors may be embodied on a single electronic device or may be distributed across a plurality of electronic devices collectively configured to function as the circuitry of a computing system (e.g., computing system 502 of FIG. 5). The plurality of processors may be in operative communication with each other and may be collectively configured to perform one or more functionalities of the circuitry of the antenna system as described herein. In an example embodiment, the processing circuitry 602 may be configured to execute instructions stored in the memory 608 or otherwise accessible to the processing circuitry 602. These instructions, when executed by the processing circuitry 602, may cause the circuitry of the antenna system to perform one or more of the functionalities, as described herein.

Whether configured by hardware, firmware/software methods, or by a combination thereof, the processing circuitry 602 may include an entity capable of performing operations according to embodiments of the present disclosure while configured accordingly. Thus, for example, when the processing circuitry 602 is embodied as an ASIC, FPGA or the like, the processing circuitry 602 may include specifically configured hardware for conducting one or more operations described herein. Additionally, or alternatively, when the processing circuitry 602 is embodied as an executor of instructions, such as may be stored in the memory 608, the instructions may specifically configure the processing circuitry 602 to perform one or more algorithms and operations described herein.

Thus, the processing circuitry 602 used herein may refer to a programmable microprocessor, microcomputer or multiple processor chip or chips that may be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a combination thereof. The memory may also be located internal to another computing resource (e.g., enabling computer readable instructions to be downloaded over the Internet or another wired or wireless connection).

The memory 608 may include suitable logic, circuitry, and/or interfaces that are adapted to store a set of instructions that is executable by the processing circuitry 602 to perform predetermined operations. Additionally, or alternately, the memory 608 may be configured to store data/ information, application programs, instructions, etc., so that the controller 600 may execute various functions according to the embodiments of the present disclosure. For example, in at least some embodiments, the memory 608 is configured to cache input data for processing by the processing circuitry 602. Thus, in at least some embodiments, the memory 608 is configured to store program instructions for execution by the processing circuitry 602. The memory 608 may store information in the form of static and/or dynamic information. When the functions are executed, the stored information may be stored and/or used by the controller 600. Example memory embodiments may include, but are not limited to, a hard disk, random access memory, 072951/ 590586 cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 608 may be integrated with the processing circuitry 602 on a single chip, without departing from the scope of the disclosure.

The communication element 604 may be implemented as any apparatus included in a circuit, hardware, a computer program product, or a combination thereof, which is configured to receive and/or transmit data from/to another component or apparatus. The computer program product comprises computer-readable program instructions stored on a computer-readable medium (for example, the memory 608) and executed by a controller 600 (for example, the processing circuitry 602). In some embodiments, the communication element 604 (as with other components discussed herein) may be at least partially implemented as the processing circuitry 602 or otherwise controlled by the processing circuitry 602. In this regard, the communication element 604 may communicate with the processing circuitry 602, for example, through a bus. The communication element 604 may comprise, for example, antennas, transmitters, receivers, transceivers, network interface cards and/or supporting hardware and/or firmware/software and is used for establishing communication with another apparatus. The communication element 604 may be configured to receive and/or transmit any data that may be stored by the memory 608 by using any protocol that may be used for communication between apparatuses. The communication element 604 may additionally or alternatively communicate with the memory 608, the input/output element 606 and/or any other component of the controller 600, for example, through a bus.

In some embodiments, the controller 600 may comprise an input/output element 606. The input/output element 606 may communicate with the processing circuitry 602 to receive instructions input by the user and/or to provide audible, visual, mechanical, or other outputs to the user. Therefore, the input/output element 606 may comprise supporting devices, such as a keyboard, a mouse, a display, a touch screen display, and/or other input/output mechanisms. Alternatively, at least some aspects of the input/output element 606 may be implemented on a device used by the user to communicate with the controller 600. The input/ output element 606 may communicate with the memory 608, the communication element 604 and/or any other component, for example, through a bus. One or a plurality of input/output modules and/or other components may be included in the controller 600.

As described herein, and as will be appreciated, embodiments of the present disclosure may be configured as systems, apparatuses, methods, and the like. Accordingly, embodiments may comprise various means including entirely of hardware or any combination of software and hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

CONCLUSION

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

The invention claimed is:

1. A system comprising:
a power storage component:
a power converter;
a signal reflector;
an antenna unit configured to receive a radio frequency signal;
a switch component electrically coupled to the antenna unit, wherein the switch component is associated with a plurality of signal processing states that comprise at least a collection state and a reflection state and is configured to:
  (i) route the radio frequency signal to the power converter in the collection state, and
  (ii) route the radio frequency signal to the signal reflector in the reflection state; and
a controller configured to selectively transition the switch component between the collection state and the reflection state based at least in part on a power capacity of the power storage component, wherein:
  (i) the plurality of signal processing states comprises a first reflection state and a second reflection state,
  (ii) the signal reflector comprises a first delay line circuit corresponding to the first reflection state, the first delay line circuit configured to generate a first reflected electrical signal for retransmitting the radio frequency signal in a first direction, and
  (iii) the signal reflector comprises a second delay line circuit corresponding to the second reflection state, the second delay line circuit configured to generate a second reflected electrical signal for retransmitting the radio frequency signal in a second direction.

2. The system of claim 1, wherein the power converter comprises a radio frequency rectifier circuit.

3. The system of claim 1, wherein the first delay line circuit is predetermined to modify an analog signal by a first angle, and the second delay line circuit is predetermined to modify the analog signal by a second angle different from the first angle.

4. The system of claim 1, wherein the controller is further configured to selectively transition the switch component to the first reflection state or the second reflection state based at least in part on external environment data.

5. The system of claim 4, wherein the external environment data comprises entity location data indicative of a position of one or more reflection targets, and wherein the controller is configured to selectively transition the switch component to the first reflection state or the second reflection state based at least in part on the position of the one or more reflection targets.

6. The system of claim 4 further comprising one or more input devices configured to generate the external environment data, wherein the one or more input devices comprise one or more entity position detectors.

7. The system of claim 4, wherein the antenna unit is configured to:
emit a first reflected radio frequency signal to a first reflection target based at least in part on the first reflected electrical signal, or
emit a second reflected radio frequency signal to a second reflection target based at least in part on the second reflected electrical signal.

8. The system of claim 7, wherein the first reflection target comprises a first unmanned aerial vehicle and the second reflection target comprises a second unmanned aerial vehicle.

9. The system of claim 1, wherein the controller comprises signal processing circuitry configured to use a signal processing model to select at least one of the plurality of signal processing states.

10. The system of claim 9, wherein the signal processing model comprises a direction finding algorithm.

11. An unmanned aerial vehicle comprising:
a power storage component;
a power converter;
a signal reflector;
an antenna unit configured to receive a radio frequency signal;
a switch component electrically coupled to the antenna unit, wherein the switch component is associated with a plurality of signal processing states that comprise at least a collection state and a reflection state and is configured to:
  (i) route the radio frequency signal to the power converter in the collection state, and
  (ii) route the radio frequency signal to the signal reflector in the reflection state; and
a controller configured to selectively transition the switch component between the collection state and the reflection state based at least in part on a power capacity of the power storage component, wherein:
  (i) the plurality of signal processing states comprises a first reflection state and a second reflection state,
  (ii) the signal reflector comprises a first delay line circuit corresponding to the first reflection state, the first delay line circuit configured to generate a first reflected electrical signal for retransmitting the radio frequency signal in a first direction, and
  (iii) the signal reflector comprises a second delay line circuit corresponding to the second reflection state, the second delay line circuit configured to generate a second reflected electrical signal for retransmitting the radio frequency signal in a second direction.

* * * * *

UNITED STATES PATENT AND TRADEMARK OFFICE
CERTIFICATE OF CORRECTION

Page 1 of 1

PATENT NO. : 12,334,745 B1
APPLICATION NO. : 18/185804
DATED : June 17, 2025
INVENTOR(S) : Chul Hong Park et al.

It is certified that error appears in the above-identified patent and that said Letters Patent is hereby corrected as shown below:

In the Claims

In Column 21, Line 9, Claim 1, delete "component:" and insert -- component; --, therefor.

Signed and Sealed this
Sixteenth Day of September, 2025

Coke Morgan Stewart
*Acting Director of the United States Patent and Trademark Office*